United States Patent [19]
Thorpe et al.

[11] 3,753,619
[45] Aug. 21, 1973

[54] INTERFERENCE SPECTROSCOPY

[75] Inventors: Leslie William Thorpe, Beckenham, Kent, England; Geoffrey Charles Hayward; James Leslie Charles Waters, both of Glenrothes, Fife, Scotland

[73] Assignee: Beckman R.I.I.C., Ltd., Glenrothes, Fife, Scotland

[22] Filed: Oct. 26, 1971

[21] Appl. No.: 192,598

[30] Foreign Application Priority Data
Oct. 27, 1970 Great Britain............... 50,975/70

[52] U.S. Cl............................... 356/106 S, 356/113
[51] Int. Cl............................. G01j 3/42, G01b 9/02
[58] Field of Search.................... 356/106 R, 106 S, 356/113, 88, 93–97, 204–206

[56] References Cited
UNITED STATES PATENTS
3,521,958  7/1970  Treharne .................... 356/93 X FOREIGN PATENTS OR APPLICATIONS
595,940   12/1947  Great Britain ............ 356/106 R
1,456,634 10/1966  France ..................... 356/106 S
1,056,566  1/1967  Great Britain ............ 356/106 S
1,103,270  2/1968  Great Britain ............ 356/106 S OTHER PUBLICATIONS
Chantry et al., "Interferometric Raman Spectroscopy Using Infra-Red Excitation," Nature, Vol. 203, No. 4949, Sept. 5, 1964, pages 1052 and 1053.

Primary Examiner—Ronald L. Wibert
Assistant Examiner—F. L. Evans
Attorney—Paul R. Harder and Robert J. Steinmeyer et al.

[57] ABSTRACT

Spectroscopic apparatus for obtaining spectral information about a sample including means for producing two parallel beams of radiation adapted to selectively pass through the sample.

Spectroscopic apparatus comprising means for producing two parallel beams of radiation adapted to selectively pass through a sample; means upon which each of the beams is incident for dividing said beams into partially reflected and partially transmitted components; means for superimposing the reflected and transmitted components of each beam upon each other to recombine the respective beams, said superimposing means including at least one reflecting means for reflecting one of the components of each beam which is movable in a direction parallel to the direction of incidence of the beam components; means for modulating the intensity of each beam at a different frequency; detector means adapted to receive radiation from each of said modulated beams; and means for measuring the amplitudes of the components of the detector output produced by each of the respective beams.

7 Claims, 3 Drawing Figures

INTERFERENCE SPECTROSCOPY

This invention relates to interference spectroscopy, and to its employment for obtaining spectral information about a sample.

One of the methods by which such information has been obtained in the past involves the use of a Michelson interferometer. In this method, electromagnetic radiation is passed through the interferometer, and successive readings are taken of the intensity of the beam (by the use of a suitable detector) leaving the interferometer as the scanning mirror is moved, both with and without a sample in the beam.

The beam entering the interferometer is split into two components by a semi-transparent and reflecting membrane and the reflected and transmitted components are reflected back onto the membrane by two mirrors in such a way that the components are recombined into one beam which then leaves the interferometer.

One of the mirrors, the so-called scanning mirror, is movable in a direction parallel to the direction of the component of the beam that is incident on it. As the scanning mirror is moved, the path difference between the two components changes (the change in path difference between the components for any displacement of the scanning mirror being twice that displacement) and a plot of the intensity of the beam leaving the interferometer against the path difference between the components is termed an interferogram. A measure of the spectrum of the beam leaving the interferometer (that is, a plot of energy of the radiation against frequency) may be obtained by Fourier transformation of the interferogram.

Information about the absorption characteristics of a sample may be obtained by plotting an interferogram with the sample in the beam either before splitting or after recombination, and by plotting a further so-called "background" interferogram without a sample so as to give the characteristics of the background radiation. From the Fourier transformations of the two interferograms, the absorption coefficient for the sample as a function of frequency can be obtained over a selected bandwidth.

Information about the refractive index of a sample may be obtained by positioning the sample so that a part, but not the whole, of one of the components of the beam split by the semi-transparent and reflecting membrane in the Michelson interferometer passes through it. An interferogram plotted with the sample in this position has two main peaks, and from a knowledge of the separation between these peaks and the thickness of the sample, the average refractive index over a selected bandwidth of radiation may be calculated. In order, however, for the refractive index of the sample as a function of frequency to be calculated two further interferograms must be plotted, one with the sample in one of the components of the beam and the other, a background interferogram, without the sample in the beam.

The invention provides spectroscopic apparatus which comprises means for producing from a single source two beams of electromagnetic radiation which are parallel to each other, means, on which each of the beams is incident, for partially reflecting and partially transmitting the radiation incident on it, means for superimposing the reflected and transmitted components of each beam on each other to produce two recombined beams, which includes means for reflecting one of the components of each beam, the reflecting means being movable in a direction parallel to the direction in which the components of the beam are incident on it, means for modulating the intensity of each beam at a certain frequency, the frequencies at which the intensities of the two beams are modulated being different from one another, a detector for the electromagnetic radiation on which each of the beams is, after modulation and recombination, incident, and means for giving a measure of the amplitudes of the components of the detector output produced by each of the beams.

Interferograms may be produced by moving the reflecting means parallel to the component of each beam incident on it and taking readings of the two components of the detector output simultaneously, (which gives a measure of the intensities of the two beams incident on the detector), during the scan of the reflecting means. The apparatus enables two independent interferograms to be produced during one scan of the reflecting means. The two interferograms produced during the scan may be compared to obtain spectral information about a sample positioned in one beam or one component of one beam in the way referred to hereinbefore, because one beam (or one component of one beam) in the present apparatus passes through the sample, and the other does not, but traverses substantially the same path, thus recording the background radiation. Thus, the same information may be obtained about the transmission characteristics of a sample during a single scan of the reflecting means, whereas two scans of the scanning mirror were required in the method described hereinbefore. Also, the same information about refractive index can be obtained with a single scan of the reflecting means as would have required three successive scans of the scanning mirror in the measurements of refractive index described above. Further, a very important advantage of the present apparatus is that the spectral information obtained about the sample will be independent of any changes of intensity of the source with time, and of any changes in detector sensitvity with time, since the amplitudes of each component of detector output for any particular position of the reflecting means are determined at the same time.

In order for the refractive index of a sample to be determined, the sample must be positioned in the path of either the reflected component or the transmitted component of one of the beams, but, for absorption measurements, the sample should be positioned in the path of one of the beams either before splitting or after recombination.

The invention also provides a method for obtaining spectral information about a sample which comprises causing two beams of electromagnetic radiation which have been produced from a single source and which are parallel to each other to be incident on means arranged to divide each beam into partially reflected and partially transmitted components, reflecting the reflected component, or the transmitted component, of each beam by means which is movable in a direction parallel to the radiation incident on it, superimposing the reflected and transmitted components of each beam on each other to produce two recombined beams, modulating the intensity of each of the beams at a certain frequency, the frequencies at which the intensities of the beams are modulated being different, detecting each of the recombined and modulated beams with the same detector, and obtaining a measure of the amplitudes of the components of the detector output produced by each of the beams, the sample being positioned in one of the beams, or one of the transmitted or reflected components of one of the beams.

Advantageously, the means for modulating the intensity of each beam is arranged to modulate that beam before it is incident on the sample. This serves to eliminate from the respective interferogram the effect of any radiation which may be emitted by the sample.

Although the partially reflecting means and the superimposing means may form part of, for example, a Mach-Zehnder interferometer, advantageously, the partially reflecting means and the superimposing means form part of an interferometer of the Michelson type, with the reflecting means as the scanning mirror.

Advantageously, the means for modulating the intensity of radiation in each beam comprises means for periodically interrupting each beam. Preferably, the interruption of each beam is effected by periodically introducing into, and withdrawing from, each beam, an opaque object. Modulating the beam in this latter way ensures that the characteristics of the radiation in the respective beam are not affected by the modulation, while at the same time facilitating the determination of the amplitudes of the respective components of the detector output.

The means for interrupting the beams preferably comprises two rotatable members, each arranged to interrupt a different one of the beams, and means for rotating each of the members at a constant speed. With such an arrangement, it is possible for the length of each interruption of the beam and the frequency of interruption to be maintained constant over long periods to a high degree of accuracy. Each member may be a plate formed with an aperture, or with a number of apertures equally spaced apart in a circumferential direction with respect to the axis of rotation of the member and of equal length in that direction. Alternatively, each member may comprise a number of blades equally spaced apart in a circumferential direction with respect to the axis of rotation of the member, and of equal length in that direction.

The means for rotating both the members may include a single motor. The members can then each be driven by the motor through, for example, suitable gearing. Alternatively, the means for rotating each of the members may include two motors, each of which is arranged to drive a different member, and which are each supplied with an alternating voltage derived from the same oscillator, the frequencies of the voltages being equal to the oscillator frequency or equal to a sub-division of the oscillator frequency.

The invention also provides a modulating unit which is suitable for use as means for modulating the intensity of the two beams in spectroscopic apparatus according to the above invention, which comprises two rotatable members, each arranged to interrupt one of the beams, and means for rotating each of the members at a constant speed.

Advantageously, the means for determining the amplitudes of the components of the detector output includes means for effecting phase-sensitive detection of the output of the detector at each of the frequencies at which the beams are modulated by reference to oscillations in phase with the modulations of the respective beams, and a smoothing circuit for each of the signals after phase-sensitive detection. The effect of the phase-sensitive detection and subsequent smoothing is to produce two d.c. signals whose amplitudes give a measure of the respective components of the detector output. Preferably, the reference oscillations are produced in response to the outputs of two photo-cells on which light is incident, a different photo-cell being associated with each beam and the light incident on each photo-cell being arranged to be modulated by the means for modulating the intensity of the respective beam at the same frequency and in a constant phase relationship with the modulations of the respective beam.

The signals corresponding to each component of the detector output after phase-sensitive detection will, in general, have superimposed on them various harmonics of the respective modulating frequency and also a.c. components having frequencies equal to the sum of, and the difference between, one fundamental modulating frequency and its harmonics and the other fundamental modulating frequency and its harmonics, respectively. One of the advantages of phase-sensitive detection is that the harmonics of even order will not be present in the signals corresponding to each component of the detector output after phase-sensitive detection. The other unwanted a.c. components can, in general, be minimized by suitable filter circuits before and/or after phase-sensitive detection.

Each smoothing circuit may comprise a low-pass filter having a cut-off lower than the frequency at which the respective beam is modulated and lower than the difference between the frequencies at which the beams are modulated.

The invention also provides a detecting unit which comprises means for effecting phase-sensitive detection of the output of the detector at each of the frequencies at which the beams are modulated by reference to oscillations in phase with the modulations of the respective beams, and a smoothing circuit for each of the signals after phase-sensitive detection. The detecting unit may include two photo-cells, on which light is incident, a different photo-cell being associated with each beam and the light incident on each photo-cell being arranged to be modulated by the means for modulating the intensity of the respective beam at the same frequency and in a constant phase relationship with the modulations of the respective beam, and the reference oscillations being produced in response to the outputs of the photo-cells.

Advantageously, the frequencies at which the two parallel beams are modulated and the response of the detector are such that the output of the detector in response to a beam of radiation which is modulated at a frequency equal to the difference between the frequencies at which the two parallel beams are modulated is small compared to the output of the detector in response to the same beam of radiation when modulated at either of the frequencies at which the two parallel beams are modulated. This tends to assist in the suppression of the fundamental difference frequency, and thus increase the accuracy with which the amplitudes of the components of the detector output are measured.

The detector may be of the Golay type, and comprise a flexible bag containing a gas, the bag being arranged to absorb radiation incident on it over a part of its surface, and an alternating current which is proportional to the changes in curvature of a different part of the surface of the bag being arranged to be produced. The alternating current may be produced by a photo-cell on which is incident light reflected from the said different part of the surface of the bag. Alternatively, the said different part of the surface may have secured to it, or may be formed by, a flexible metallic member which is arranged to form one side of a condenser microphone in a suitable detection circuit. Such a detector may be employed for radiation lying within a range of wavelengths from $5 \times 10^{-1}$cm to $5 \times 10^{-4}$cm.

Spectroscopic apparatus suitable for, and a method of, obtaining spectral information about samples, constructed in accordance with the invention will now be described, by way of example, with reference to the accompanying drawings, of which:

Figure 1:
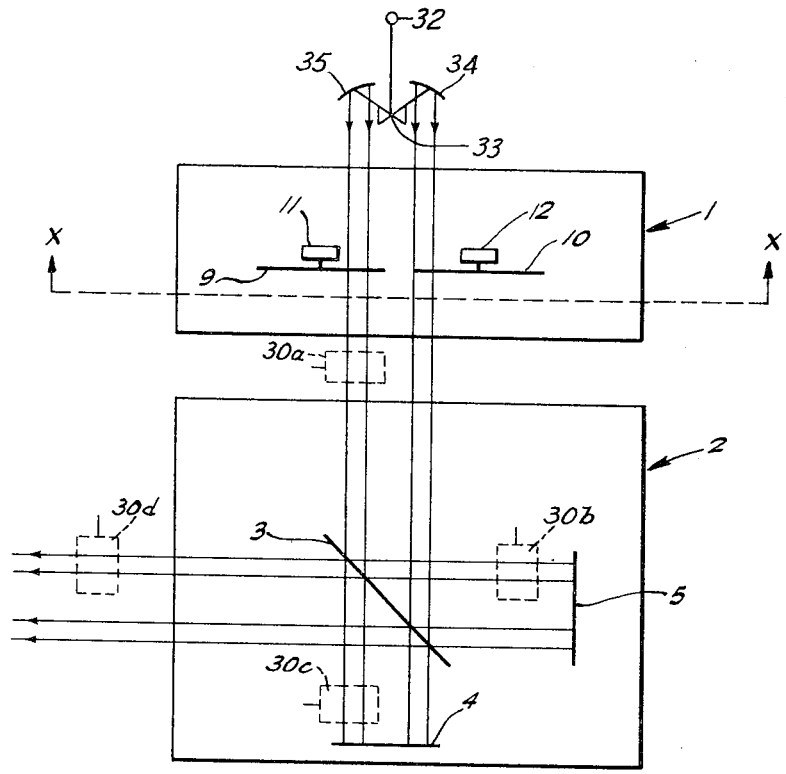
FIG. 1 is a schematic view of a part of the apparatus.

Referring to FIG. 1, two beams of light, which each emanate from the same point source of radiation 32 to be reflected by mirrors 33, 34 and 35, the beams being parallel to one another, pass through a modulating unit 1, where they are interrupted at different frequencies, and into a Michelson interferometer 2. The two beams leaving the interferometer are focussed onto a single detector and, by means of suitable electronic circuitry, the amplitudes of the components of the detector output produced by each of the beams (which give a measure of the intensities of each of the beams incident at the detector) can be simultaneously determined. The sample (designated 30a, 30b, 30c or 30d) is positioned in one of the beams before splitting (as indicated at 30a) or after recombination (as indicated at 30d) for transmission measurements, or in one of the reflected (as indicated at 30b or transmitted as indicated at 30c) components of one of the beams for refractive index measurements.

The Michelson interferometer comprises, in the usual way, a semi-transparent and reflecting membrane 3 arranged with its plane at 45° to the planes of two mutually perpendicular mirrors 4 and 5. The two parallel beams are arranged to be incident normally on the mirror 4. The so-called scanning mirror 5 is movable in a direction parallel to its normal at a constant velocity under the control of a drive mechanism (not shown) which is adjustable so that the magnitude of the velocity of the scanning mirror for any particular scan can be adjusted.

Figure 2:
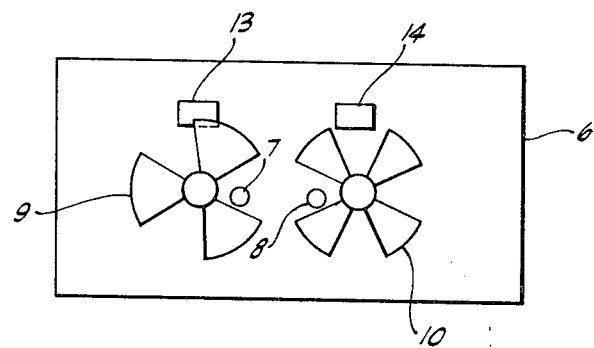
FIG. 2 is a section through the modulating unit for the beams taken through the line X—X of FIG. 1.

Referring to FIG. 2, the modulating unit 1 comprises a box 6, in the front and rear walls of which are formed two apertures 7 and 8 to allow the passage of the two parallel beams of radiation. The size of each of the apertures 7 and 8 is variable to enable the intensity of radiation in each beam to be varied. The box 6 houses two rotatable members 9 and 10 which consist of three, and four, outwardly-extending blades, respectively. The members 9 and 10 are so positioned that when they are rotated, they each periodically interrupt one of the parallel beams. The edges of the blades of each member extend in radial directions perpendicular to the axis of rotation of the member, and are equally spaced in a circumferential direction with respect to the axis of rotation of the respective member.

The members 9 and 10 are driven at the same speed by motors 11 and 12 respectively, which are each driven from the same oscillator. Although the members 9 and 10 are each driven at the same speed, the frequencies of interruption of the beams will be different because the members have different numbers of blades.

The box 6 also houses two photo-cell units 13 and 14 (shown diagrammatically) which each consist of a photo-cell and a light source so arranged that the blades of the members 9 and 10 interrupt the light falling on the photo-cells as the members rotate. The light incident on each of the photo-cells is interrupted for the same length of time, at the same frequency as for the respective beam, and in a constant phase relationship with the modulations of the beam. The photo-cell units 13 and 14 are movable in a horizontal direction so as to be able to adjust the phase of the interruptions of the respective beam. The output of each of the photo-cells is employed for phase-sensitive detection of the output of the detector.

The detector for the radiation is a Golay detector 15. The fact that the response of the Golay detector is dependent on the frequency of variation of the intensity of the radiation incident upon it limits the choice of frequencies at which the beams can be modulated. With the present apparatus, frequencies of modulation of $10H_z$ for one beam and $15H_z$ for the other, have been found to be satisfactory.

Figure 3:
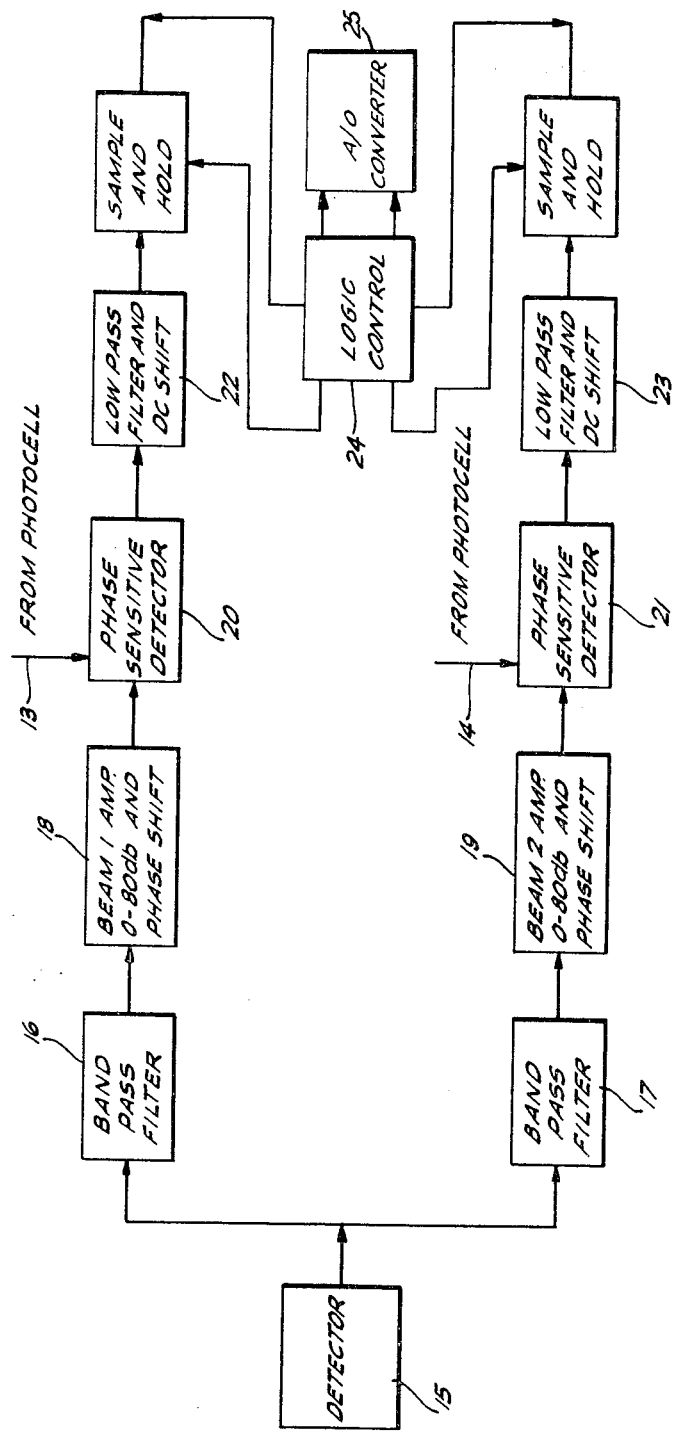
FIG. 3 is a block diagram of the electronic circuitry associated with the detector.

Referring to FIG. 3, the output of the Golay detector 15 is divided into two parts which are each fed along a separate path. The electronic circuitry in each of the paths enables the amplitude of one of the components of the detector output to be determined.

Each part of the output of the Golay detector is fed to a band pass filter 16 or 17 which is arranged to pass frequencies equal to the respective fundamental frequency but to suppress frequencies equal to or greater than that of the third harmonic of the respective signal. The band pass filters 16 and 17 also suppress some of the sum and difference frequencies associated with the components of the detector output.

The outputs of the band pass filters 16 and 17 are fed, through amplifiers 18 and 19, respectively, to phase-sensitive detectors 20 and 21, respectively, where they are phase-sensitively detected in response to the outputs of the photo-cells 13 and 14, respectively. The photo-cell units are, in operation, initially moved horizontally, thereby altering the phases of the modulations of the photo-cell outputs in relation to the phases of the interruptions of the respective beams, until the outputs from the phase-sensitive detectors 20 and 21 are maximum.

The outputs of the phase-sensitive detectors 20 and 21 pass to low pass filters 22 and 23 in order to smooth them. With the frequencies of modulations referred to earlier, the filters may, for example, have a cut-off of about $1H_z$, that is to say, passing frequencies below $1H_z$. The outputs of the low pass filters 22 and 23 are each in the form of a d.c. signal whose amplitude is a measure of the amplitude of the component of the detector output produced by the respective beam incident on the detector.

The Golay detector and the components in each of the paths into which the detector output is divided are arranged to be such that the output of each of the paths is linearly related to the intensity of the respective beam of light incident on the detector.

The difference frequency which would normally have the greatest amplitude, that is, the difference frequency between the two fundamental frequencies at which the beams are modulated can to some extent, by a suitable choice of modulating frequencies, be arranged to be reduced by the Golay detector itself. With modulating frequencies of $10H_z$ and $15H_z$, or $10.5H_z$ and $13H_z$, the fundamental difference frequency of $5H_z$ or $2½H_z$ is small compared to the output of the detector to the same radiation modulated at frequencies from $10H_z$ to $15H_z$.

The smoothed signals are finally passed, under the control of a logic control 24, to an analogue to digital converter 25, and the digital information can be recorded on paper tape, magnetic tape or stored in the converter.

In operation, with the sample positioned in the path of one of the beams before splitting or after recombination, or in one of the components of one of the beams, the scanning mirror of the Michelson interferometer is moved at a constant speed in the usual way, and successive readings of the signal from each of the low pass filters are taken at the same time at equal intervals of time as the scanning mirror moves. Each of the readings is stored for a short time, and the logic control sends first a reading associated with one beam, and then a reading (taken at the same time) associated with the other beam, to the analogue to digital converter. Alternatively, pairs of successive readings of the output from the filters can be taken as the scanning mirror is moved forwards to successive positions by equal distances.

Information about the transmission and/or refractive index of a sample may be obtained from the interferograms produced by using a suitable computer.

What is claimed is:

1. A method for obtaining spectral information about a sample including the steps of:
   providing from a single source two parallel beams of radiation;
   dividing each beam into partially reflected and partially transmitted components;
   recombining the respective beams by superimposing the reflected and transmitted components of each beam upon each other;
   modulating the intensity of the beams at different frequencies;
   monitoring the intensity of each of the recombined beams with a radiation responsive detector; and
   measuring the amplitude of the components of the detector output with a sample positioned in one of the beams.

2. Spectroscopic apparatus comprising means for producing two parallel beams of radiation from a single source;
   means upon which each of the beams is incident for dividing said beams into partially reflected and partially transmitted components;
   means for superimposing the reflected and transmitted components of each beam upon each other to recombine the respective beams, said superimposing means including at least one reflecting means for reflecting one of the components of each beam which is movable in a direction parallel to the direction of incidence of the beam components;
   means for modulating the intensity of each beam at a different frequency;
   means for positioning a sample in the path of one of said beams;
   detector means adapted to receive radiation from each of said modulated beams; and
   means for measuring the amplitudes of the components of the detector output produced by each of the respective beams.

3. Spectroscopic apparatus as defined in claim 2 wherein said sample is positioned in the path of one of said beams after modulation of said beams.

4. Spectroscopic apparatus as defined in claim 2 wherein said superimposing means comprise at least part of a Michelson-type interferometer, with said reflecting means comprising a scanning mirror of said interferometer.

5. Spectroscopic apparatus as defined in claim 2 wherein said modulation means comprise a separate rotatable member for each beam, with said rotatable members being positioned to introduce into and withdraw from each beam an opaque object at a predetermined frequency.

6. Spectroscopic apparatus as defined in claim 5 wherein said rotatable members each comprise a rotatable fan driven by a constant speed motor.

7. Spectroscopic apparatus as defined in claim 2 wherein said means for measuring the amplitude of the components of the detector output includes a phase-sensitive detector tuned to the frequencies at which said beams are modulated, and a filter circuit adapted to receive each of the respective signals after phase-sensitive detection.

* * * * *